(12) United States Patent
Garcia et al.

(10) Patent No.: US 7,492,724 B2
(45) Date of Patent: *Feb. 17, 2009

(54) METHOD FOR DATA TRANSMISSION

(75) Inventors: Enrique Garcia, Tucson, AZ (US); Yvonne Hanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/425,991

(22) Filed: Jun. 22, 2006

(65) Prior Publication Data

US 2007/0140156 A1   Jun. 21, 2007

Related U.S. Application Data

(63) Continuation of application No. 10/136,921, filed on May 1, 2002, now Pat. No. 7,103,006.

(51) Int. Cl.
*G01R 31/08* (2006.01)

(52) U.S. Cl. .................................. 370/252; 370/230
(58) Field of Classification Search ............... None
See application file for complete search history.

(56) References Cited

U.S. PATENT DOCUMENTS 7,215,671 B1 * 5/2007 Karasawa .............. 370/395.1

* cited by examiner

*Primary Examiner*—Duc C Ho
(74) *Attorney, Agent, or Firm*—Rabindranath Dutta; Konrad Raynes & Victor LLP

(57) ABSTRACT

Provided is a method, for data communications. A transmitter transmits a plurality of packets, wherein each packet is transmitted after a time interval. A receiver receives at least one part of the plurality of packets. The receiver determines whether all parts of a packet are received before expiration of the time interval, wherein the received packet is valid if all parts are received before the expiration of the time interval.

7 Claims, 8 Drawing Sheets

METHOD FOR DATA TRANSMISSION

CROSS-REFERENCE TO RELATED APPLICATIONS

This application is a continuation of application Ser. No. 10/136,921 filed on May 1, 2002, which is incorporated herein by reference in its entirety.

BACKGROUND OF THE INVENTION

1. Field of the Invention

The present invention relates to a method, system, and an article of manufacture for data transmission.

2. Description of the Related Art

Serial data communications refers to communicating data one bit at a time over a serial transmission link between two devices. There are two basic types of serial communications, synchronous and asynchronous. With synchronous serial data communications, the two devices may initially synchronize with each other by each synchronizing to a common clock, and then continually send characters to stay synchronized. Even when data is not really being sent, a constant flow of bits allows the devices to stay synchronized with each other at any given time. That is, each character that is sent is either actual data or an idle character. The requirement of clock synchronization is an overhead for synchronous serial data communications.

With asynchronous serial data communications the two devices do not synchronize to each other by continually synchronizing with a common clock. Thus asynchronous serial data communications does not require sending and receiving idle characters. However, in asynchronous serial communication the beginning and end of each byte of data is identified by start and end delimiters. The start delimiter indicates when the data byte is about to begin and the end delimiter signals when the data byte ends. The requirement to include the start and stop delimiter with data transmission causes asynchronous communications to be slower than synchronous communications. However, asynchronous communications has the advantage that the devices do not have to deal with the additional idle characters.

For example, prior art asynchronous techniques for transmitting packets of data via serial transmission links encode the data in a data encoding format, such as the American Standard Code for Information Interchange (ASCII). The prior art asynchronous serial data transmission techniques add delimiters, such as special characters, to demarcate the start and the end of the data transmission. A start of text (STX) delimiter indicates the start of the data transmission, and an end of text (ETX) delimiter indicates the end of the data transmission. Data received outside of the bounds of an STX and ETX are assumed invalid and discarded. Many prior art asynchronous communications rely on Universal Asynchronous Receiver/Transmitters (UART) to send, receive, encode and decode data across the serial transmission links.

Although asynchronous transmission does not require clock synchronization, the asynchronous requirement of encoding transmitted data with delimiters increases the transmission overhead. Hence, there is a need in the art to provide improved techniques for asynchronous serial data transmission.

SUMMARY OF THE PREFERRED EMBODIMENTS

Provided are a method, system and article of manufacture for data communications. A transmitter transmits a plurality of packets, wherein each packet is transmitted after a time interval. A receiver receives at least one part of the plurality of packets. The receiver determines whether all parts of a packet are received before expiration of the time interval, wherein the received packet is valid if all parts are received before the expiration of the time interval.

In one implementation, the time interval is greater than a time interval between a beginning of a transmission and an end of the transmission of each transmitted packet. Additionally, in a further implementation the transmitter sends one packet within a predetermined time interval. The transmitter waits for a duration greater than the predetermined time interval and sends a next packet within the predetermined time interval. In a further implementation, the receiver receives a first part of the plurality of packet. After receiving the first part, the receiver waits for the predetermined time interval. The receiver receives additional parts of the plurality of packets during the waiting. If the first and additional parts together equal a length of the one packet, then the receiver determines that the at least one packet is a valid packet.

In another implementation, each transmitted packet comprises a plurality of data segments, and wherein the time interval is greater than a time interval between a beginning of a transmission and an end of the transmission of two contiguous data segments in each transmitted packet. Additionally, in a further implementation the transmitter transmits all data segments of a packet with consecutive data segments separated by a time less than or equal to a maximum data segment separation duration. Following a transmission of all data segments of a packet, the transmitter suspends the transmission for a period equal to a packet separation duration, wherein the packet separation duration is greater than the maximum data segment separation duration. In further implementations, the receiver receives a first data segment. After, receiving the first data segment, the receiver waits for the maximum data segment separation duration. The receiver receives additional data segments during the waiting. If the first and additional data segments equal the packet length, then the receiver determines that a valid packet has been received.

The present implementations provide a technique for asynchronous serial communications without transmitting packets of data with start and end delimiters. By eliminating delimiters the overhead of encoding and decoding data are eliminated. In addition, since the data transmission can be in binary mode, the implementations reduce the data volume by more than half for both long and short data transmissions by avoiding transmitting ASCII encoded data with delimiters. The implementations also significantly reduce the time for data transmission when the packets of data are small.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

The present implementations recognize that prior art techniques for implementing asynchronous serial communications by transmitting packets of data with start and end delimiters have drawbacks that cause overhead in data transmission. For example, ETX and STX delimiters increase overhead in the encoding and decoding of data in the ASCII format. In addition, the length of the data transmission is increased. In particular, when the amount of data transmitted is small, the overhead of including start and end delimiters relatively high.

Figure 1:
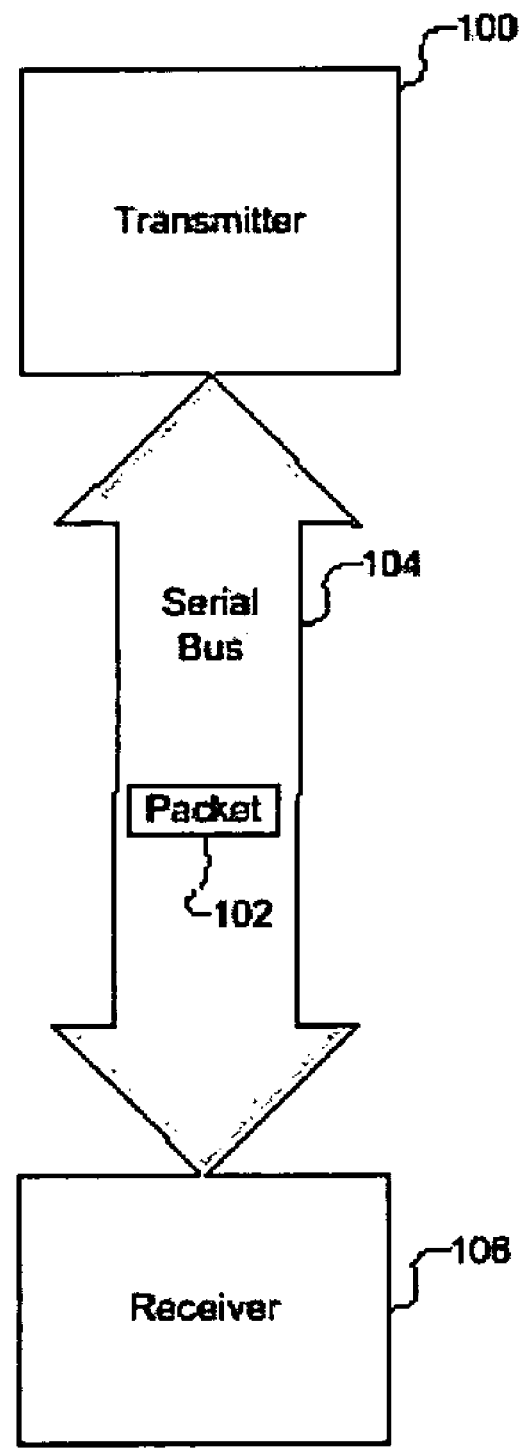
FIG. 1 illustrates a block diagram of a computing environment in which certain described aspects of the invention are implemented.

FIG. 1 illustrates a block diagram of a computing environment in which certain aspects of the invention are implemented. A transmitter 100 sends a packet 102 of data across a serial bus 104 to a receiver 106. While only a single packet 102 is shown, over a period of time the transmitter 100 transmits a plurality of packets across the serial bus 104.

The transmitter 100 and the receiver 106 may be any device known in the art, such as a computational device, a peripheral device, a controller device etc. The computational device, including the transmitter 100 and the receiver 106, may be any computational device known in the art, such as a personal computer, a workstation, a server, a mainframe, a hand held computer, a palm top computer, a telephony device etc. The peripheral device, including the transmitter 100 and the receiver 106, may be any peripheral device known in the art such as a serial printer, a serial imaging device, etc. The controller device, including the transmitter 100 and the receiver 106, may be any controller known in the art, such as a power controller, a disk controller etc. The serial bus 104 may be any serial bus known in the art, including an universal serial bus (USB), an IEEE 1394 serial bus (Firewire), a RS232C serial bus etc.

Figure 2:
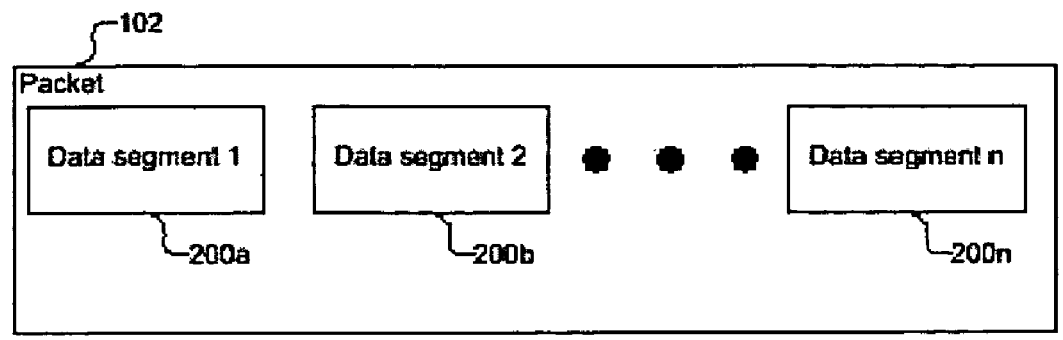
FIG. 2 illustrates a block diagram of data structures related to a packet and packet transmission and reception attributes in accordance with certain described implementations of the invention.
Figure 2:
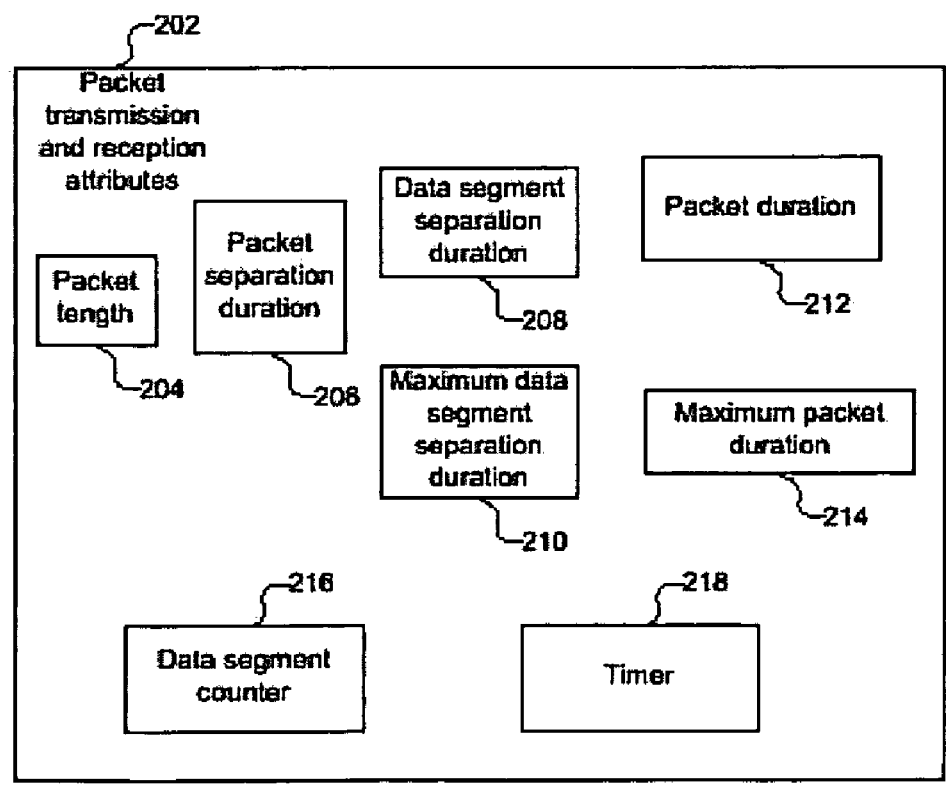

FIG. 2 illustrates a block diagram of data structures related to a packet and packet transmission and reception attributes in accordance with certain implementations of the invention. The packet 102 of data comprises a plurality of data segments 200a, 200b, . . . 200n, where each data segment 200a, 200b, . . . 200n is at least one bit in length. For example, a one byte packet may comprise eight data segments, where each data segment is one bit. In the implementation, each data segment 200a . . . 200n has an equal number of bit(s) and each packet 102 has an identical number of data segments 200a . . . 200n. However, in alternative implementations the number of bits in two data segments 200a . . . 200n of the same packet 102 may be different, and two different packets transmitted in sequence by the transmitter 100 may have a different number of data segments 200a . . . 200n. The packet 102 may be encoded as binary data.

Various packet transmission and reception attributes 202 are associated with the packet 102. The transmitter 100 and the receiver 106 may each store some or all of the packet transmission and reception attributes 202. A packet length 204 denotes the length of the packet 102 as the number of data segments within the packet 102. For example, if the packet 102 is comprised of eight data segments then the packet length 204 for packet 102 is eight data segments. A packet separation duration 206 is the time duration between the transmission of two consecutive packets. For example, if the transmitter 100 transmits a first packet and a second packet two microseconds apart, then the packet separation duration 206 between the first packet and the second packet is two microseconds.

A data segment separation duration 208 is the time duration between the transmission of two consecutive data segments of a packet 102. For example, if the transmitter 100 transmits a packet 102 with a first and a second data segment separated by one microsecond, then the data segment separation duration 208 between the first and second data segments of packet 102 is one microsecond. A maximum data segment separation duration 210 is the maximum possible value for the data segment separation duration 208 between any two consecutive data segments. For example, if in an implementation the maximum data segment separation duration 210 is 2.5 microseconds then the data segment separation duration 208 is at most 2.5 milliseconds between any two consecutive data segments.

A packet duration 212 is the time duration to transmit a packet 102. For example, if the transmitter 100 transmits the packet 102 in 5.2 microseconds, then the packet duration 212 for the packet 102 is 5.2 microseconds. In certain implementations, the packet transmission overhead is included in the packet duration 212. Such overhead may include time to generate the packet, etc. In alternative implementations, the packet duration 212 may not include the packet transmission overhead.

A maximum packet duration 214 is the maximum possible transmission time for the packet duration 212 for any packet. For example, if the maximum packet duration 214 is 10.3 microseconds, then each packet 102 transmitted by the transmitter 100 must be transmitted in at most 10.3 microseconds.

A data segment counter 216 coupled to the receiver 106 keeps count of the number of data segments received by the receiver 106. The receiver 106 can set the data segment counter 216 to zero at any time and can also increment the data segment counter 216.

A timer 218 coupled to the receiver 106 keeps track of elapsed time on the receiver 106. The receiver 106 can set the timer 218 to any value at any time and can also perform various comparison operations against the value stored in the timer 218.

Figure 3:
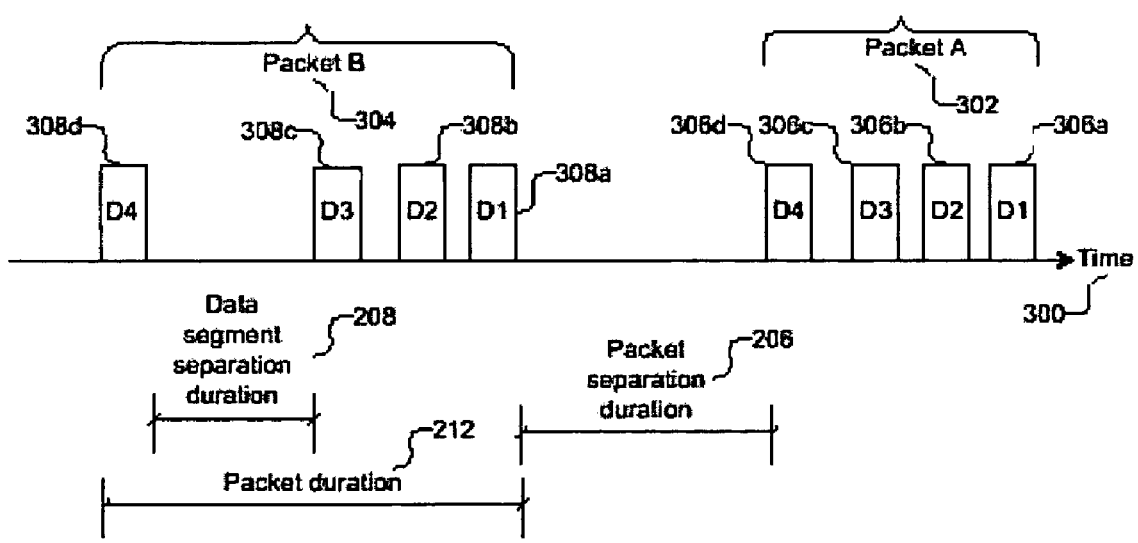
FIG. 3 illustrates a diagram to exemplify various timing durations in a sequence of transmitted packets in accordance with certain described aspects of the invention.

FIG. 3 illustrates a diagram to exemplify various timing durations in a sequence of transmitted packed in accordance with certain aspects of the invention. The horizontal axis indicates time 300, with the time 300 increasing to to the right. Shown on the horizontal axis indicating time 300, are packet A 302 and packet B 304 transmitted consecutively by the transmitter 100.

Packet A 302 comprises four data segments D1, D2, D3, D4 (indicated by reference numerals 306a . . . 306d). Packet B 304, transmitted after packet A 302 also comprises four data segments D1, D2, D3, D4 (indicated by reference numerals 308a . . . 308d). FIG. 3 also illustrates the packet separation duration 206 between packet A 302 and packet B 304, the data segment separation duration 208 between data segments 308c and 308d, and the packet duration 212 of packet B 304.

Figure 4A:
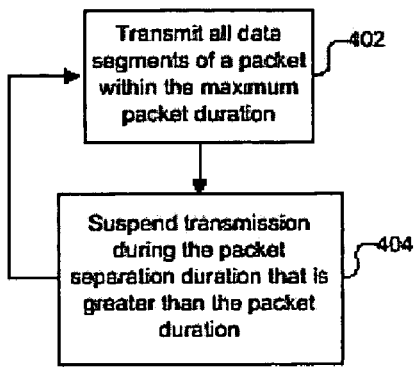
FIGS. 4a and 4b illustrate logic implemented in a transmitter and a receiver respectively, in accordance with certain described implementations of the invention.
Figure 4B:
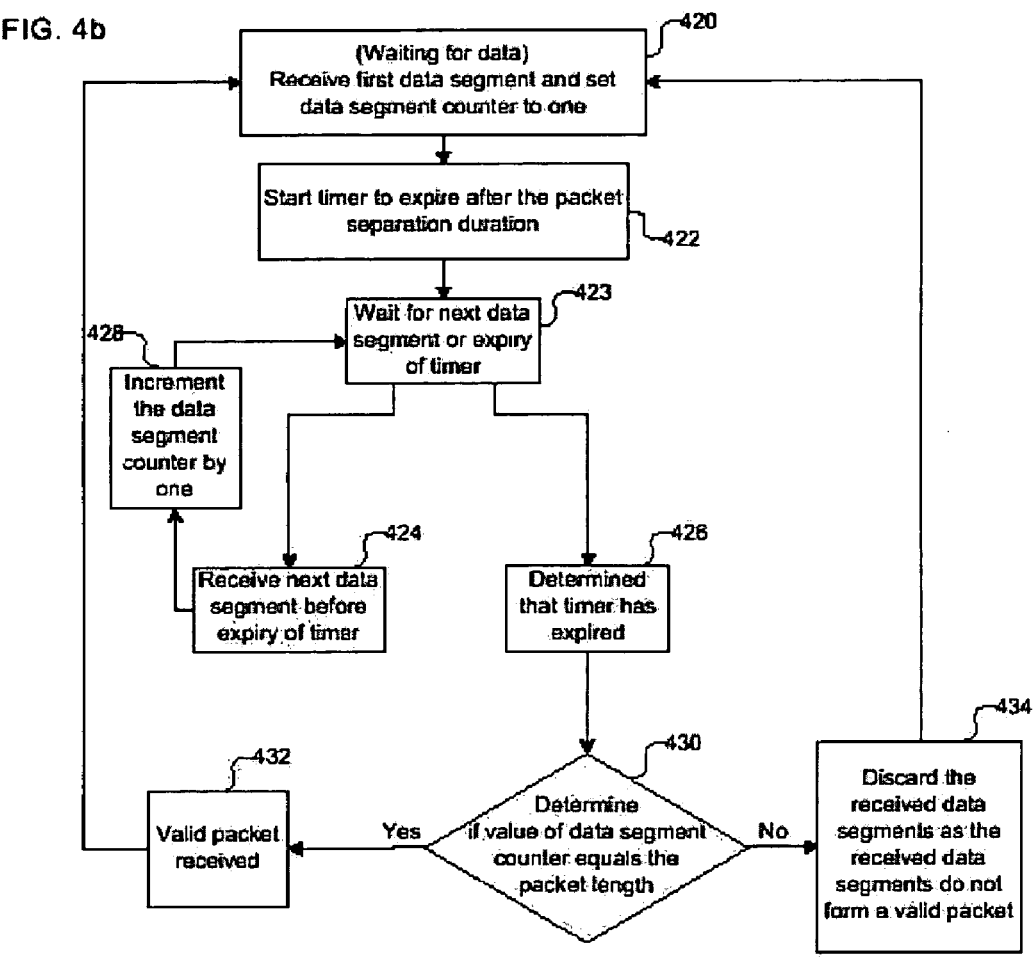

FIGS. 4a and 4b illustrate logic implemented in the transmitter 100 and the corresponding logic implemented in the receiver 106 respectively, in accordance with certain inplementations of the invention. In FIG. 4a, at block 402, the transmitter 100 transmits all data segments 200a . . . 200n of a packet 102 within the maximum packet duration 214, where the maximum packet duration 214 is predetermined. The transmission is carried by the serial bus 104 connected to the receiver 106. Control proceeds to block 404, where the transmitter 100 suspends transmission for a time period equal to the packet separation duration 206. In certain implementations, the packet separation duration 206 is greater than the maximum packet duration 214 for packets transmitted by the transmitter 100. Control proceeds to block 402, where the transmitter 100 continuously keeps executing the logic formed by blocks 402 and 404, as the transmitter 100 transmits a sequence of packets. Hence, the transmitter 100 is transmitting packets such that any two consecutive packets have a packet separation duration 206 that is greater then the packet duration 212 of any transmitted packet 102.

In FIG. 4b, at block 420, the receiver 106, while waiting for data transmitted by transmitter 100, receives a first data segment and sets the data segment counter 216 to one.

Control proceeds to block 422, where the receiver 106 starts the timer 218 to expire after the packet separation duration 206 has elapsed. Control proceeds to block 423, where the receiver 106 waits for a next data segment sent by the transmitter 100 or for the expiry of the timer 218. From block 423 control may proceed to either block 424 or block 426. Control proceeds to block 424 if the receiver 106 receives a next data segment before the expiry of the timer 218, wherein if the timer 218 expires before the receiver 106 receives the next data segment control proceeds to block 426 and the receiver 106 determines (at block 426) that the timer 218 has expired. In certain implementations the receiver 106 is interrupted by a software or hardware interrupt when the next data segment is received, and after receiving the interrupt determines whether the next data segment has been received before the expiry of the timer 218. Also, in certain implementation the timer 218 sends a software or a hardware interrupt to the receiver 106 when the timer 218 expires, and after receiving the interrupt the receiver 106 determines at block 426 that the timer has expired.

From block 424, control proceeds to block 428 where the receiver 106 increments the data segment counter 216 by one and subsequently control proceeds to block 423 and the loop formed by blocks 423, 424, 428 may be executed a plurality of times. In the loop formed by blocks 423, 424, 428 the receiver 106 keeps a count of the number of data segments received without the packet separation duration having elapsed From block 426, control proceeds to block 430 where the receiver 106 determines if the value of the data segment counter 216 equals the packet length 204. If so, control proceeds to block 432 and the receiver 106 determines that a valid packet 102 has been received. Control proceeds to block 420, where the receiver 106 waits for data from the transmitter 100 once again.

If at block 430 the receiver 106 determines that the value of the data segment counter 216 does not equal the packet length 204, control proceeds to block 434 where the receiver 106 discards the received data segments as the received segments do not form a valid packet. Control proceeds to block 420, where the receiver 106 waits for data from the transmitter 100 once again.

In the implementations described in FIGS. 4a and 4b, the packet separation duration 206 is greater than the packet duration 212 for each packet 102 that is transmitted by the transmitter 100. The receiver 106 determines the number of data segments 200a . . . 200n received within the packet separation duration 206. If the number of data segments 200a . . . 200n received within the packet separation duration 206 equals the packet length 204 then the data segments 200a . . . 200n form a valid packet received at the receiver 106. If not, the data segments 200a . . . 200n are discarded by the receiver 106.

Figure 5:
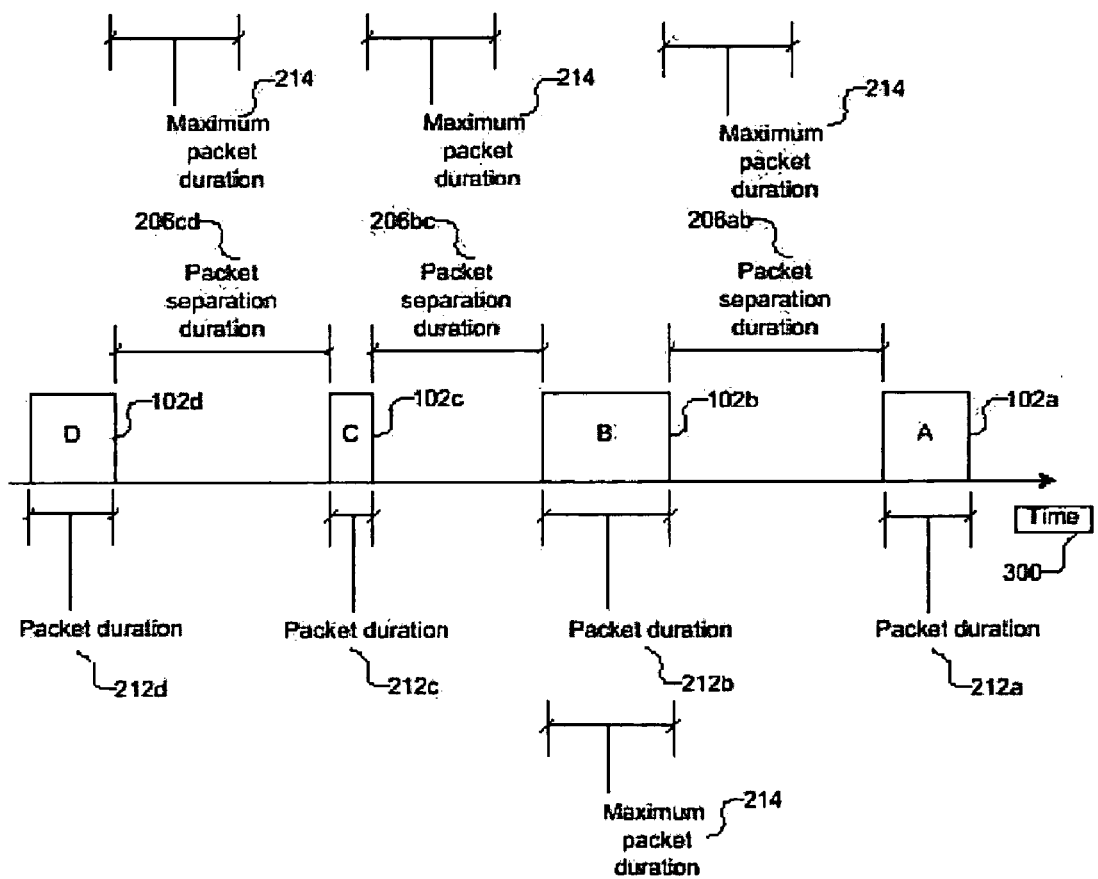
FIG. 5 illustrates a diagram to exemplify the logic described in FIGS. 4a and 4b.

FIG. 5 illustrates a diagram to exemplify the logic described in FIGS. 4a and 4b. In FIG. 5, packet A 102a with packet duration 212a, packet B 102b with packet duration 212b, packet C 102c with packet duration 212c, and packet D 102d with packet duration 212d are shown on the horizontal axis indicating time 300. The packet separation duration 206 between packets 102a and 102b, 102b and 102c, and 102 and 102d are illustrated by the packet separation durations 206ab, 206bc, and 206cd respectively. In accordance with the logic described in FIGS. 4a and 4b, the packet separation durations 206ab, 206bc and 206cd are all more than the packet durations 212a, 212b, 212c, and 212d. Furthermore, the packet durations 212a, 212b, 212c, and 212d do not exceed the maximum packet duration 214.

Figure 6A:
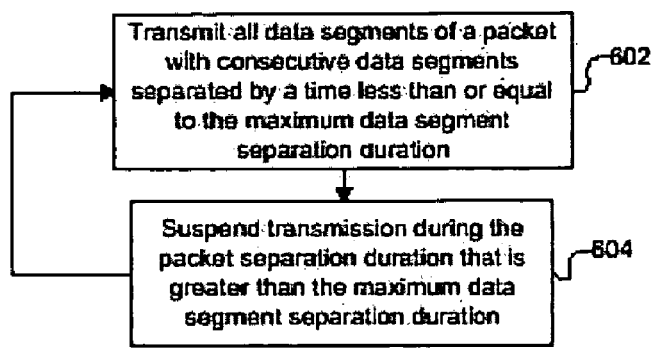
FIGS. 6a and 6b illustrate alternative logic implemented in a transmitter and receiver respectively, in accordance with certain described implementations of the invention.
Figure 6B:
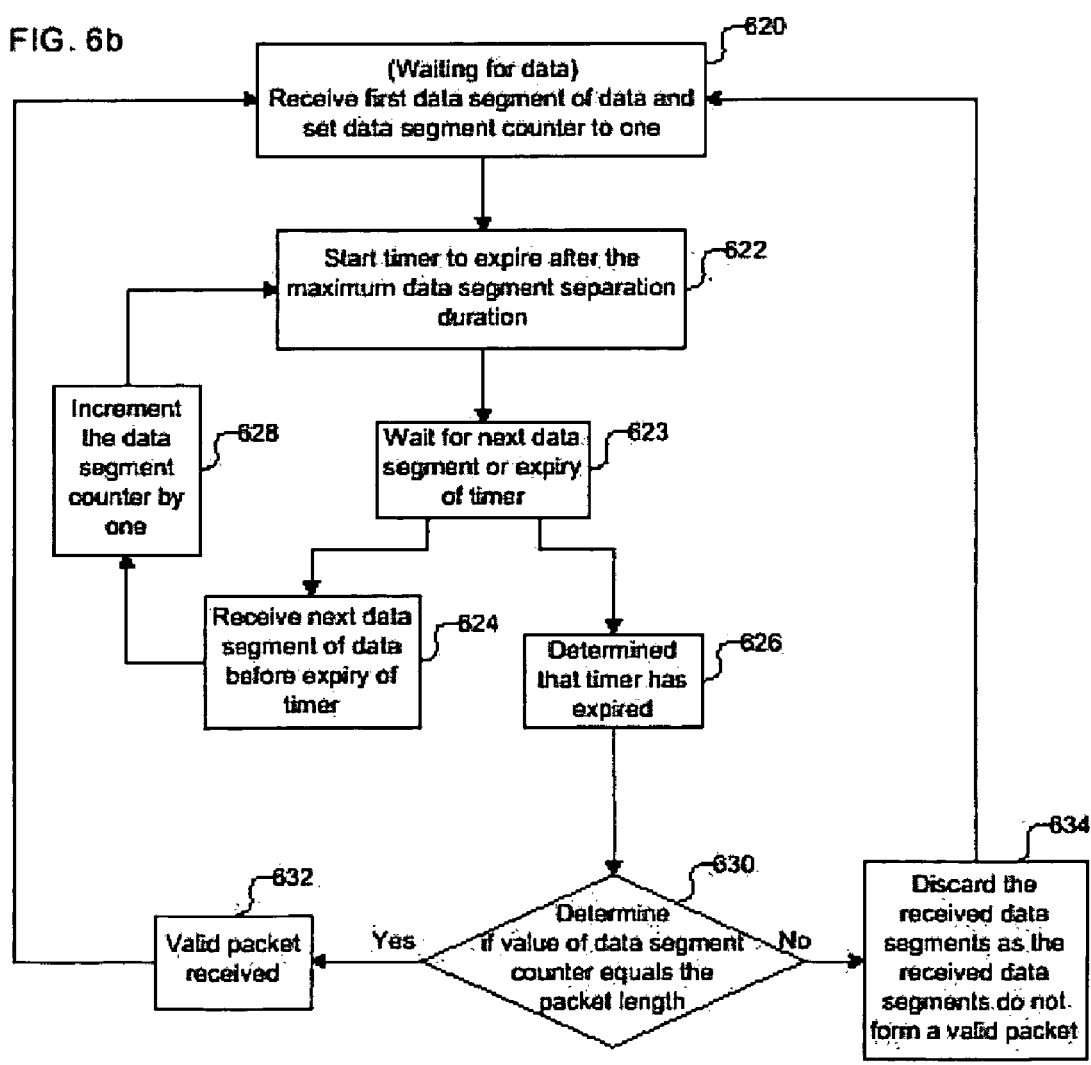

FIGS. 6a and 6b illustrate alternative logic implemented in the transmitter 100 and the corresponding logic implemented in the receiver 106 respectively, in accordance with certain implementations of the invention. In FIG. 6a, at block 602 the transmitter 100 transmits all data segments 200a . . . 200n of a packet 102, with consecutive data segments separated by a time less than or equal to the maximum data segment separation duration 210 that is predetermined. Control proceeds to block 604, where the transmitter 100 suspends transmission during the packet separation duration 206, where the packet separation duration is greater than the maximum data segment separation duration 210. Control proceeds to block 602, and the loop formed by blocks 602 and 604 are repeated a plurality of times.

In FIG. 6b, at block 620, the receiver 106 while waiting for data transmitted by transmitter 100 receives a first data segment and sets the data segment counter 216 to one. Control proceeds to block 622, where the receiver 106 starts the timer 218 to expire after the maximum data segment separation duration 210 has elapsed. Control proceeds to block 623, where the receiver 106 waits for a next data segment sent by the transmitter 100 or for the expiry of the timer 218. From block 623 control may proceed to either block 624 or block 626. Control proceeds to block 624 if the receiver 106 receives a next data segment before the expiry of the timer 218, whereas if the timer 218 expires before the receiver 106 receives the next data segment control proceeds to block 626 and the receiver 106 determines (at block 626) that the timer 218 has expired. In certain implementations the receiver 106 is interrupted by a software or hardware interrupt when the next data segment is received, and after receiving the interrupt determines whether the next data segment has been received before the expiry of the timer 218. Also, in certain implementations the timer 218 sends a software or a hardware interrupt to the receiver 106 when the timer 218 expires, and after receiving the interrupt the receiver 106 determines at block 626 that the timer has expired.

From block 624, control proceeds to block 628 where the receiver 106 increments the data segment counter 216 by one and subsequently control proceeds to block 622 and the loop formed by blocks 622, 623, 624, 628 may be executed a plurality of times. In the loop formed by blocks 622, 623, 624, 628 the receiver 106 keeps a count of the number of data segments received without the maximum data segment separation duration 210 having elapsed.

From block 626, control proceeds to block 630 where the receiver 106 determines if the value of the data segment counter 216 equals the packet length 204. If so, control proceeds to block 632 and the receiver 106 determines that a valid packet 102 has been received. Control proceeds to block 620, where the receiver 106 waits for data from the transmitter 100 once again.

If at block 630 the receiver 106 determines that the value of the data segment counter 216 does not equal the packet length 204, control proceeds to block 634 where the receiver 106 discards the received data segments as the received data segments do not form a valid packet. Control proceeds block 620, where the receiver 106 waits for data from the transmitter 100 once again.

In the implementations described in FIGS. 6a and 6b, for each packet 102 that is transmitted by the transmitter 100 the packet separation duration 206 is greater than the maximum data segment separation duration 210, and each of the data segment separation durations 208 is individually less than or equal to the maximum data segment separation duration 210. The receiver 106 determines the number of data segments 200a . . . 200n received within the maximum data segment separation duration 210. If the number of data segments 200a . . . 200n received within the maximum data segment separation duration 210 equals the packet length 204 then the data segments 200a . . . 200n form a valid packet received at the receiver 106. If not, the received data segments 200a . . . 200n are discarded by the receiver 106.

Figure 7:
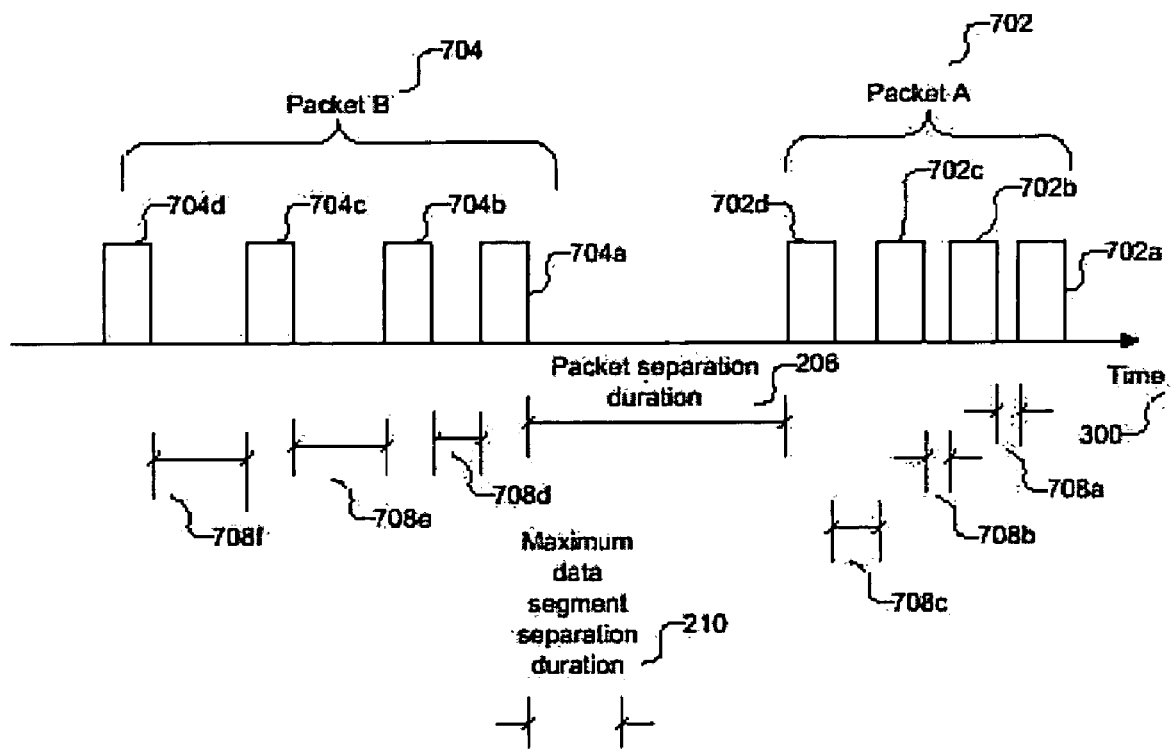
FIG. 7 illustrates a diagram to exemplify the logic described in FIGS. 6a and 6b; and, FIG. 8 illustrates a diagram of a computer architecture of the transmitter and the receiver, in accordance with certain described implementations of the invention.

FIG. 7 illustrates a diagram to exemplify the logic described in FIGS. 6a and 6b. In FIG. 7, packet A 702 and packet B 704 are shown separated by the packet separation duration 206 on the horizontal axis indicating time 300. Packet A 702 comprises of four data segments 702a . . . 702d, and packet B 704 comprises of four data segments 704a . . . 704d. Packets A and B 702, 704 possess data segment separation durations 708a . . . 708f as illustrated in FIG. 7. In conformance with the logic described in FIG. 6, the packet separation duration 206 is greater than the maximum data segment separation duration 210, and each of the data segment separation durations 708a . . . 708f are individually less than or equal to the maximum data segment separation duration 210.

The present implementations provide a technique for asynchronous serial communications without transmitting packets of data with start and end delimiters. In one implementation, the packet separation duration 206 is greater than the packet duration 212 for each packet 102 that is transmitted by transmitter 100. The receiver 106 determines whether a valid packet has been received by counting the number of data segments 200a . . . 200n received within the packet separation duration 206 and determining if the count equals the packet length 204. In another implementation, the packet separation duration 206 is greater than the maximum data segment separation duration 210 for each packet 102 that is transmitted by the transmitter 100. Furthermore, each of the data segment separation durations 208 for the packet 102 is individually less than or equal to the maximum data segment separation duration 210. The receiver 106 determines whether a valid packet has been received by counting the number of data segments 200a . . . 200n received within the maximum data segment separation duration 210 and determining if the count equals the packet length 204. No start and stop delimiters are necessary for determining the validity of packets at the receiver 106 in the implementations.

By eliminating delimiters the overhead of encoding and decoding data are eliminated. In addition, the length of the data transmission is reduced. In particular, when the packets 102 of data are small, the implementation can significantly reduce the time for data transmission.

Furthermore, in order to use delimiters such as STX and ETX all data must also be ASCII encoded. Data transmission with ASCII encoding more than doubles the amount of data when compared to binary transmission. The implementations can transmit in binary and reduce the volume of transmitted data by more than half when compared to ASCII encoded data with delimiters. In very long transmissions the implementations transmit a significantly smaller volume of data while transmitting the same information as ASCII encoded data with delimiters.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 8:
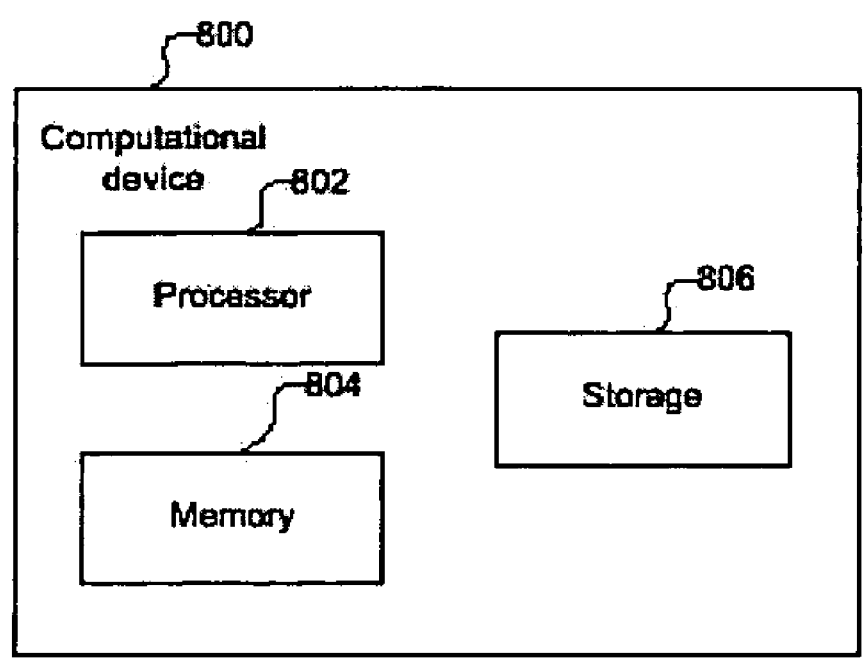

FIG. 8 illustrates a block diagram of an architecture in which certain aspects of the invention are implemented. FIG. 8 illustrates one implementation of the transmitter 100 and the receiver 106. These systems 100, 106 may implement a computational device 800 having a processor 802 (e.g., a microprocessor, an arithmetic logic unit), a memory 804 (e.g., a volatile memory device), and a storage 806 (e.g., a non-volatile storage, such as ROM, magnetic disk drives, optical disk drives, a tape drive, etc.) Programs in the storage 806 may be loaded into the memory 804 and executed by the processor 802 in a manner known in the art. Programs external to the computational device 800 may also be loaded into the memory 804 and executed by the processor 802 in a manner known in the art.

The implementations of FIGS. 4a, 4b, 6a and 6b describe specific operations occurring in a particular order. Further, the steps may be performed in parallel as well as sequentially. In alternative embodiments, certain of the logic operations may be performed in a different order, modified or removed and still implement preferred embodiments of the present invention. Moreover, steps may be added to the above described logic and still conform to the preferred embodiments.

While the transmitter 100 and receiver 106 communicate with a serial bus 104 in the described implementations, they may also communicate with any other technique known in the art. Furthermore, many of the software and hardware components have been described in separate modules for purposes of illustration. Such components may be integrated into a fewer number of components or divided into larger number of components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since, many implementations of the invention can be made without departing from the spirit and scope of the invention, the invention resides in the claims hereinafter appended.

What is claimed is:

1. A method for data communications, comprising:
   transmitting a plurality of packets, wherein each packet is transmitted after a time interval;
   receiving at least one part for each of the plurality of packets; and
   determining whether all parts of a packet are received before expiration of the time interval, wherein the received packet is valid if all parts are received before the expiration of the time interval, wherein each transmitted packet comprises a plurality of data segments, and wherein the time interval is greater than a time interval between a beginning of a transmission and an end of the transmission of two contiguous data segments in each transmitted packet.

2. The method of claim 1, wherein each transmitted packet comprises a plurality of data segments, wherein a maximum packet duration is a maximum possible transmission time for any packet of the plurality of packets, wherein following a transmission of all data segments of any packet, the transmission is suspended for a period equal to a packet separation duration that is greater than the maximum packet duration, and wherein the time interval after which each packet is transmitted is the packet separation duration.

3. The method of claim 2, wherein receiving at least one part for each of the plurality of data segments comprises receiving a sequence of data segments.

4. The method of claim 1, wherein the transmitting is performed by a transmitter, and further comprising:
   sending one packet within a predetermined time interval;
   waiting for a duration greater than the predetermined time interval; and
   sending a next packet within the predetermined time interval.

5. The method of claim 4, wherein the receiving and determining are performed by a receiver, and farther comprising:
   receiving a first part of the plurality of packets;
   after receiving the first part, waiting for the predetermined time interval;
   receiving additional parts of the plurality of packets during the waiting; and
   if the first and additional parts together equal a length of the one packet, then determining that the one packet is a valid packet.

6. The method of claim 5, wherein the waiting further comprises: staffing a timer to expire after the predetermined time interval.

7. The method of claim 1, wherein the transmitting is performed by a transmitter, wherein the receiving and determining are performed by a receiver, wherein the transmitting and receiving are over a serial communication medium connecting the transmitter and the receiver, wherein the transmitting and receiving are asynchronous, wherein the packets do not have start and stop delimiters, and wherein errors in the transmitted packets are detected while determining the valid packet.

* * * * *